US011327700B1

(12) United States Patent
Crossen et al.

(10) Patent No.: US 11,327,700 B1
(45) Date of Patent: May 10, 2022

(54) MODIFICATION OF PRINT QUEUES BASED ON USER ACTION AND URGENCY

(71) Applicant: Xerox Corporation, Norwalk, CT (US)

(72) Inventors: Elizabeth M. Crossen, Churchville, NY (US); Ron E. Dufort, Rochester, NY (US); Dara N. Lubin, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/142,321

(22) Filed: Jan. 6, 2021

(51) Int. Cl.
*G06F 3/12* (2006.01)

(52) U.S. Cl.
CPC .......... *G06F 3/1263* (2013.01); *G06F 3/1204* (2013.01); *G06F 3/1222* (2013.01); *G06F 3/1238* (2013.01); *G06F 3/1292* (2013.01)

(58) Field of Classification Search
None
See application file for complete search history.

(56) References Cited

U.S. PATENT DOCUMENTS

| 8,181,261 | B2 | 5/2012 | Sperry | |
|---|---|---|---|---|
| 8,302,166 | B2 | 10/2012 | Balakrishnan et al. | |
| 8,593,672 | B2 | 11/2013 | Aoyama et al. | |
| 8,854,665 | B2 | 10/2014 | Muranaka | |
| 2006/0066891 | A1* | 3/2006 | Ikeda | G06F 3/1222 358/1.15 |
| 2007/0024893 | A1 | 2/2007 | Hosoda | |
| 2007/0290499 | A1 | 12/2007 | Tame | |
| 2011/0205570 | A1 | 8/2011 | Matsuda | |
| 2017/0264765 | A1* | 9/2017 | Nobutani | G06F 3/1238 |

OTHER PUBLICATIONS

Fuji Xerox, "Smart WelcomEyes Advance", https://www.fujixerox.com/eng/company/technology/production/digital/smart_welcomeyes_advance.html. Accessed on Nov. 11, 2020, pp. 1-3.

* cited by examiner

*Primary Examiner* — Thomas D Lee
(74) *Attorney, Agent, or Firm* — Gibb & Riley, LLC

(57) ABSTRACT

Various systems and methods maintain a print job of a user in a print queue and identify the user approaching a printing device using a user identification device operatively connected to the printing device. Such systems/methods alter the position of the print job within the print queue (e.g., to a higher priority position) or even begin printing the print job when the user identification device identifies the user approaching the printing device (i.e., before the user reaches the printing device). Systems and methods can also identify the urgency of the user using the user identification device. The amount that the print queue is altered can be based on the amount that the urgency of the user is elevated.

20 Claims, 5 Drawing Sheets

Print Queue

| Print Job | Status |
|---|---|
| 152 → BJoy0024 | Printing |
| 154 → SSing13 | Pending |
| 156 → HUpton003 | Processing |
| 158 → VNeep022 | Downloading |
| 160 → BPatch148 | Waiting |

Print Queue

| Print Job | Status |
|---|---|
| 152 → BJoy0024 | Printing |
| 160 → BPatch148 ⇑ | Downloading |
| 154 → SSing13 | Pending |
| 156 → HUpton003 | Processing |
| 158 → VNeep022 | Paused |

Print Queue

| Print Job | Status |
|---|---|
| 156 → HUpton003 ⇑ | Printing |
| 152 → BJoy0024 | Paused |
| 154 → SSing13 | Pending |
| 158 → VNeep022 | Downloading |
| 160 → BPatch148 | Waiting |

# MODIFICATION OF PRINT QUEUES BASED ON USER ACTION AND URGENCY

BACKGROUND

Systems and methods herein generally relate to printing systems and more particularly to modification of print jobs within print queues based on user action and user urgency.

Equipment usage efficiencies promote centralized equipment, such as shared multi-function devices (MFDs) that have the ability to print, copy, scan, fax, email, upload and download documents from networks, etc. Therefore, rather than allocating an MFD to every office, it is often more efficient for multiple offices to share a single MFD (or group of MFDs). This allows an often more expensive MFD that is faster and prints at a higher quality to be accessible to all employees for the same cost (or reduced cost) when compared to supplying lower quality, slower devices in each office. The tradeoff for this access to a higher-quality MFD is that sometimes a user must wait for other user's previously submitted jobs to be completed before their job can start.

SUMMARY

Various systems herein include a printing device maintaining a print queue and a user identification device operatively connected to the printing device. The user identification device can be, for example, a facial recognition device, a voice recognition device, a radio frequency identification (RFID) device, a near field communications (NFC) device, etc., and can be positioned at a location to identify a user when the user is approaching the printing device. The print queue maintains a print job of the user. The printing device is adapted to alter the position of the print job within the print queue (e.g., to a higher priority position) or even begin printing the print job when the user identification device identifies the user approaching the printing device (i.e., before the user reaches the printing device).

More specifically, the printing device has a user interface positioned to be seen and physically interacted with by the user, but the user identification device is positioned at a separate location from the user interface that avoids physical interaction between the user and the user identification device. The user identification device can be physically separate from the printing device and can be in communication with the printing device through a computerized network. In one example, the user identification device can be located along pathways the user travels to approach the printing device.

In some embodiments, the user identification device can be adapted to identify urgency of the user and the printing device can be adapted to alter the position of the print job within the print queue or begin printing the print job based on the amount of the urgency of the user.

Various methods herein maintain a print job of a user in a print queue and identify the user approaching a printing device with a user identification device operatively connected to the printing device. These methods alter the position of the print job within the print queue (e.g., to a higher priority position) or even begin printing the print job when the user identification device identifies the user approaching the printing device (i.e., before the user reaches the printing device).

The printing device has a user interface positioned to be seen and physically interacted with by the user, and the methods herein position the user identification device at a separate location from the user interface that avoids physical interaction between the user and the user identification device. More specifically, these methods position the user identification device to be physically separate from the printing device (e.g., to be located along pathways the user travels to approach the printing device) and to be in communication with the printing device through a computerized network.

These methods can also identify the urgency of the user using the user identification device. Such methods further base the amount that the print queue is altered on the amount that the urgency of the user is elevated.

These and other features are described in, or are apparent from, the following detailed description.

BRIEF DESCRIPTION OF THE DRAWINGS

Various exemplary systems and methods are described in detail below, with reference to the attached drawing figures, in which:

FIGS. 2A-2C are schematic diagrams illustrating print queues herein.

DETAILED DESCRIPTION

Figure 1:
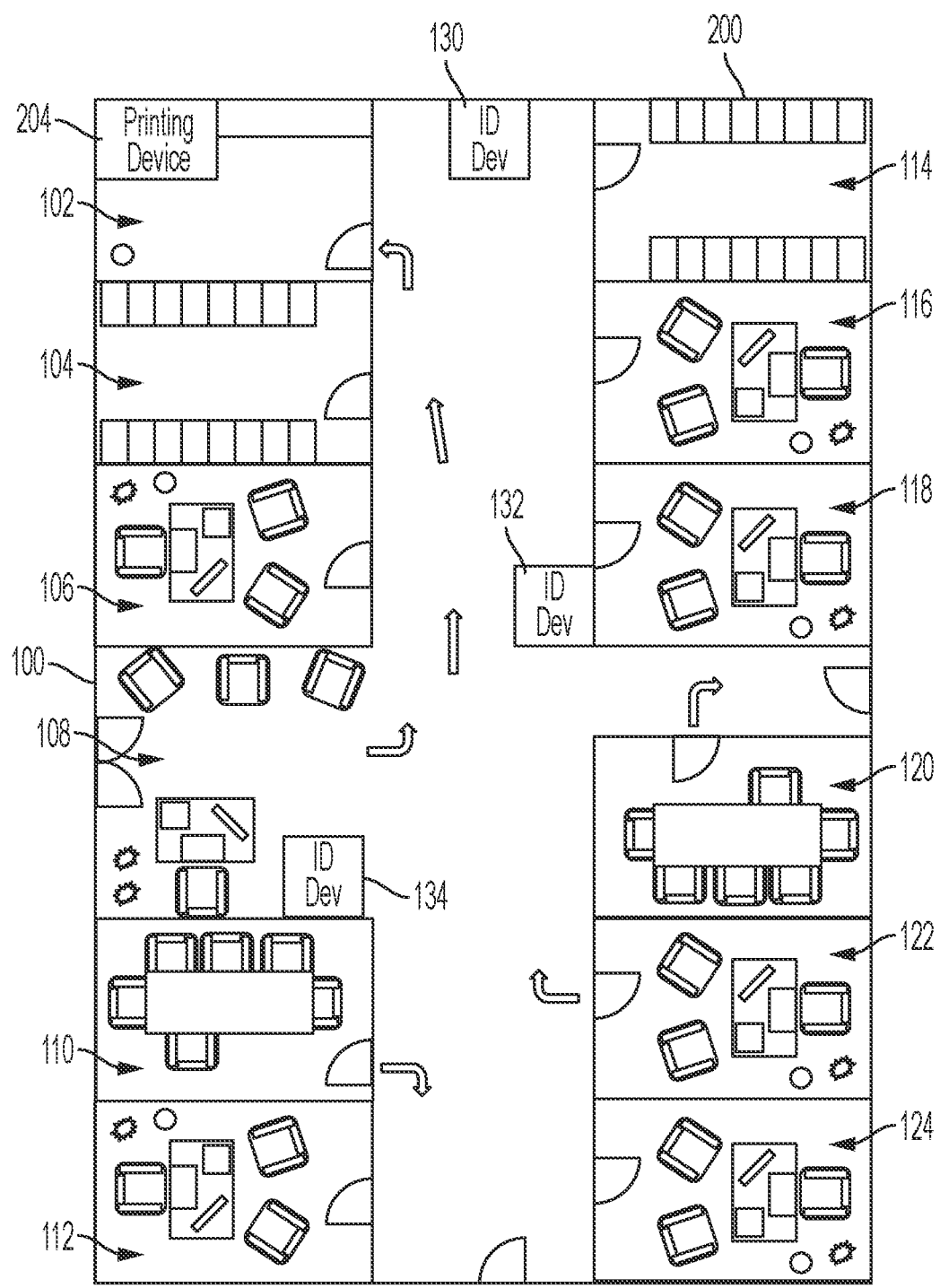
FIG. 1 is a schematic diagram illustrating systems herein.

As mentioned above, when higher quality, faster multi-function devices (MFDs) are used as shared devices, sometimes a user must wait for other user's previously submitted print jobs to be completed before their job can start. This can waste employees time, especially when higher priority jobs are behind lower priority jobs. While print queues allow manual identification of job priority and allow manual priority changes, these manual processes can be cumbersome and may require elevated access rights. More central is that priority print queue changes may still result in wasted employee time, especially when the employee makes changes to the print queue through the user interface of the MFD, requiring the user to stand at the MFD during pre-print processing and printing.

Therefore, the systems and methods herein anticipate the user's arrival before the user reaches the MFD and automatically alter the position of the user's print job within the print queue (e.g., to a higher priority position) or even begin printing the print job when the user still in the act of approaching the printing device and before the user actually reaches the printing device in order to reduce the amount of employee time that is wasted standing in front of the MFD. This results in higher user satisfaction and more productive employees.

Thus, the systems and methods herein provide print job prioritization based on user urgency and proximity to the device. The systems and methods herein can recognize users based on facial or voice recognition, RFID (radio frequency identification) chips in employee badges, etc. RFID sensors are used to wake up cameras for facial recognition. With systems and methods herein the MFD assigns print job priority based on user proximity to the device, so that when a user is approaching the MFD to pick up their print job, if their job has not been already completed it will be repositioned to the front of the queue.
}

Voice recognition is utilized by systems and methods herein. In some examples, a baseline for each employee's voice is recorded and stored. Deviations from the stored version of the user's voice due to urgency or impatience triggers the systems and methods herein to output the user's job as quickly as possible. Facial recognition is used to identify known users so that the systems and methods herein can individually and personally greet each user. This allows users to set up preferred settings (if security allows for such) and the same is used to pull up the user's job.

In other words, the systems and methods herein uniquely incorporate identification technology, such as voice or facial recognition, RFID sensors, etc., to add convenience for the user and to make the MFD feel more like a workplace assistant and member of the office team through user interaction. The systems and methods herein provide added security, improve office efficiency through an addition to the office MFD that gives the device a futuristic feel, and satisfies users.

Additionally, the systems and methods herein provide error proofing of queue alteration. For example, because the systems and methods automatically alter job priority within a queue without manual input, this removes the potential dangers of users manually manipulating the queue to promote their own jobs, where users might inadvertently delete or indefinitely pause someone else's job while promoting their own.

Further, the systems and methods herein provide efficient data control for large-scale workflows with variable inputs, such as drive through appointments. In one example of drive-through virus testing or inoculation, several thousand people may have appointments at a given site each day. For data integrity of the test results ("chain of custody"), paperwork such as patient ID, pre-screen survey info, and other patient information needs to be printed and accompany the test kit and samples. During the day, patients in cars enter the testing area, but some may be early, late, or unregistered, and there may be many parallel lines of vehicles being handled at once and some make take longer to process than others, which makes it difficult to arrange the paperwork in the same order that the patients will arrive and be tested. Thus, when patients do not arrive at the test stations exactly in their appointment order, delays can occur while nurses/technicians sort and reorder the printed paperwork, or while paperwork is manually promoted/printed.

The systems and methods disclosed herein address such situations very well by automatically detecting patients/vehicles via facial recognition, license-plate reading, EZpass RFID tags, etc. This allows the systems and methods herein to order/reorder the print jobs in the print queue so that the printed paperwork is in the same order that the patients will reach the test station.

Also, in such situations, print jobs can also be promoted or delayed in the queue with respect to predicted wait times. Thus, if one line of cars is only advancing 1 car every 3 minutes, and another line is advancing 1 car every 30 seconds, then the paperwork of patients in the faster moving line is printed ahead of patients in the other line of cars to make sure that the paperwork is in the same order that the patients will arrive at the test area.

While drive-through virus testing is used as an example above, the same feature of systems and methods herein can be applied to other mass events that can utilize individualized ordered printing, including mass testing sites, blood drives, vaccine inoculations, concerts, museums and parks, border crossings, trauma centers, etc.

FIG. 1 illustrates some aspects of systems herein. Specifically, FIG. 1 is a floorplan view of an office 100 that includes a printer workroom 102 (in which is located at least one printing device 204), a file room 104, computer equipment room 114, offices 106, 112, 116, 118, 122, 124, lobby 108, conference rooms 110, 120, and various user identification devices 130, 132, 134 located in hallways and other strategic locations.

The printing device 204 maintains a print queue 150 (shown in FIGS. 2A-2C, discussed below). The one or more user identification devices 130, 132, 134 can be operatively (directly or indirectly) connected to the printing device 204. The user identification device(s) 130, 132, 134 can be, for example, a facial recognition device, a voice recognition device, and/or wireless communication devices (such as a radio frequency identification (RFID) device, a near field communications (NFC) device, etc.), and/or a combination of such devices (and similar devices).

More specifically, the printing device 204 has a user interface (item 212 shown in FIG. 6, discussed below) positioned to be seen and physically interacted with by the user, but the user identification device(s) 130, 132, 134 are positioned at a separate location from the user interface 212 that avoids physical interaction between the user and the user identification device(s) 130, 132, 134. The user identification device(s) 130, 132, 134 can be physically separate from the printing device 204 or can be connected thereto. The user identification device(s) 130, 132, 134 can be in communication with the printing device 204 through a computerized network (item 202 shown in FIG. 4 and discussed below).

As shown in FIG. 1, the user identification device(s) 130, 132, 134, can be positioned at locations to identify a user when a user is approaching the printing device 204. In one example, the user identification device(s) 130, 132, 134 can be located along pathways the user travels to approach the printing device 204. For example, the user identification device(s) 130, 132, 134 can be positioned along office hallways and can recognize users (verbal identification, facial recognition, RFID recognition, etc.) and follow users to determine if they are approaching the printing device (which is especially useful when multiple user identification devices 130, 132, 134 operate together to determine a user's path and likely destination).

In greater detail, FIG. 1 uses block arrows to illustrate that users may take a path out of conference rooms 110 and 120 that are not toward the printer workroom 102 and such movement away from the printing device 204 could be detected by the user identification devices 132, 134. In contrast, FIG. 1 also uses block arrows to illustrate that users in the lobby 108 or in office 122 may take initial paths toward the printing device 204. If such users continue movement toward the printer workroom 102, as shown by the block arrows in FIG. 1, and not toward other rooms the user identification devices 130, 132, 134 and/or printing device 204 can predict that the user is approaching the printing device 204.

For example, the user identification devices 130, 132, 134, could judge user's movement relative to the user identification devices 130, 132, 134 according to relative size in images (increasing/decreasing), relative loudness of voice patterns (increasing/decreasing), relative strength of wireless signals (increasing/decreasing). Alternatively, the user identification devices 130, 132, 134 can work together (e.g., using triangulation) to determine user's positions, movement, paths, etc. Additionally, the user identification devices 130, 132, 134 can include distance measurement devices (e.g., laser distance measurement devices, sound distance measurement devices, etc.) to determine user's relative positions, motion, directions, etc.

The printing device 204 and/or the user identification devices 130, 132, 134 can also include a path predictive element that records a user's regular pattern of movement (after initial user identification). Characteristic motions, movements, sounds, acts, etc., that users make when heading toward the printing device 204 ("path signatures" which can be unique to each user) can be learned over time through the path predictive element to increase the accuracy of predicting when a user will head toward or away from the printing device 204.

In some limited examples, one user may always go to the printing device 204 immediately after placing a print job in the print queue, while other users may wait different amounts of time after placing print jobs in the print queue. Some users may never go into the printer workroom 102, while other users may be very frequent visitors. These regular habits or actions are recorded and analyzed statistically to contribute to and refine each user's unique path signature. In another example, a user that occupies office 116 may walk on different sides of the hallway leading to the printer workroom 102 when approaching office 116 verses the printer workroom 102, and such movement could contribute to the path signature of that user. Many other actions, movements, timing patterns, etc., can be stored and statistically tracked by the path predictive element operating on the user identification devices 130, 132, 134 and/or printing device 204 to develop and refine the various path signatures of the different users. In addition, paths of unknown users or first-time users (those lacking a path signature) may be predicted based on averages of other users or averages of unknown users.

As shown in FIG. 2A, the print queue 150 maintains one or more print jobs (152-160) of one or more users. Specifically, the exemplary print queue 150 shown in FIG. 2A includes print jobs 152-160, each of which has a name/identifier and a status that is shown in the print queue 150. FIG. 2A shows the print queue 150 before any priority changes are made by systems and methods herein.

The printing device 204 is adapted to alter the position of the print job within the print queue 150 (e.g., to a higher priority position) or even begin printing the print job when the user identification devices 130, 132, 134 identify when the user is approaching the printing device 204 (i.e., before the user reaches the printing device 204). This is shown in FIG. 2B where the lowest priority print job 160 in FIG. 2A is elevated to the second priority print job in the queue 150 (between print jobs 152 and 154) in FIG. 2B. Note that in FIG. 2B, the downloading of print job 158 is paused (FIG. 2A shows job 158 currently downloading) so that the print job 160 that had its priority changed can start downloading and be printed as soon as downloaded and pre-print processed.

In some embodiments, the user identification device(s) 130, 132, 134 can be adapted to identify the urgency of the user (change in voice or facial patterns from stored base patterns) and the printing device 204 can be adapted to alter the position of the print job within the print queue 150 or begin printing the print job based on the amount of urgency of the user. This is shown in FIG. 2C where the priority of the print job 156 is elevated from the processing status in FIG. 2A to a printing status in FIG. 2C. Note that the previous top priority job 152 (in FIG. 2A) is paused in FIG. 2C to allow the changed priority print job 156 to be printed as quickly as possible.

For example, if a user's voice shows characteristic patterns of stress (louder than base measurements, higher pitch than base measurements, etc.) or a user's movements are faster than base (e.g., the user is running or walking very quickly toward the printing device 204), the user identification devices 130, 132, 134 and/or printing device 204 can determine that there is user urgency. Also, situational circumstances can be identified by the user identification devices 130, 132, 134 and/or printing device 204 to determine that there is user urgency. For example, if it is close to the end of an employee's scheduled working time, any print jobs provided to the print queue from the employee whose shift is ending may be determined to be urgent. Similarly, if a user's calendar indicates that a meeting hosted by the user is starting shortly or is currently occurring, print jobs issued to the print queue by that user may be marked as being urgent.

Additionally, different levels of urgency may be established based on how unusual the user's actions are (e.g., how much the user's actions depart from their previously recorded base actions). Therefore, if a user is merely walking 20% faster than their average walking pace, a slight amount of urgency may be identified and the user's print job may merely be placed near or at the top of the print queue; while, in contrast, if the user is running or moving at twice their average walking pace, a large amount of urgency may be identified, and all other jobs may be paused while all MFD resources are devoted to immediately printing the user's print job. Thus, in one example low, medium-low, medium, medium-high, and high levels of urgency (or other granularity measures) may be identified, each determining how much adjustment is made to the user's position (priority) in the print queue.

Figure 3:
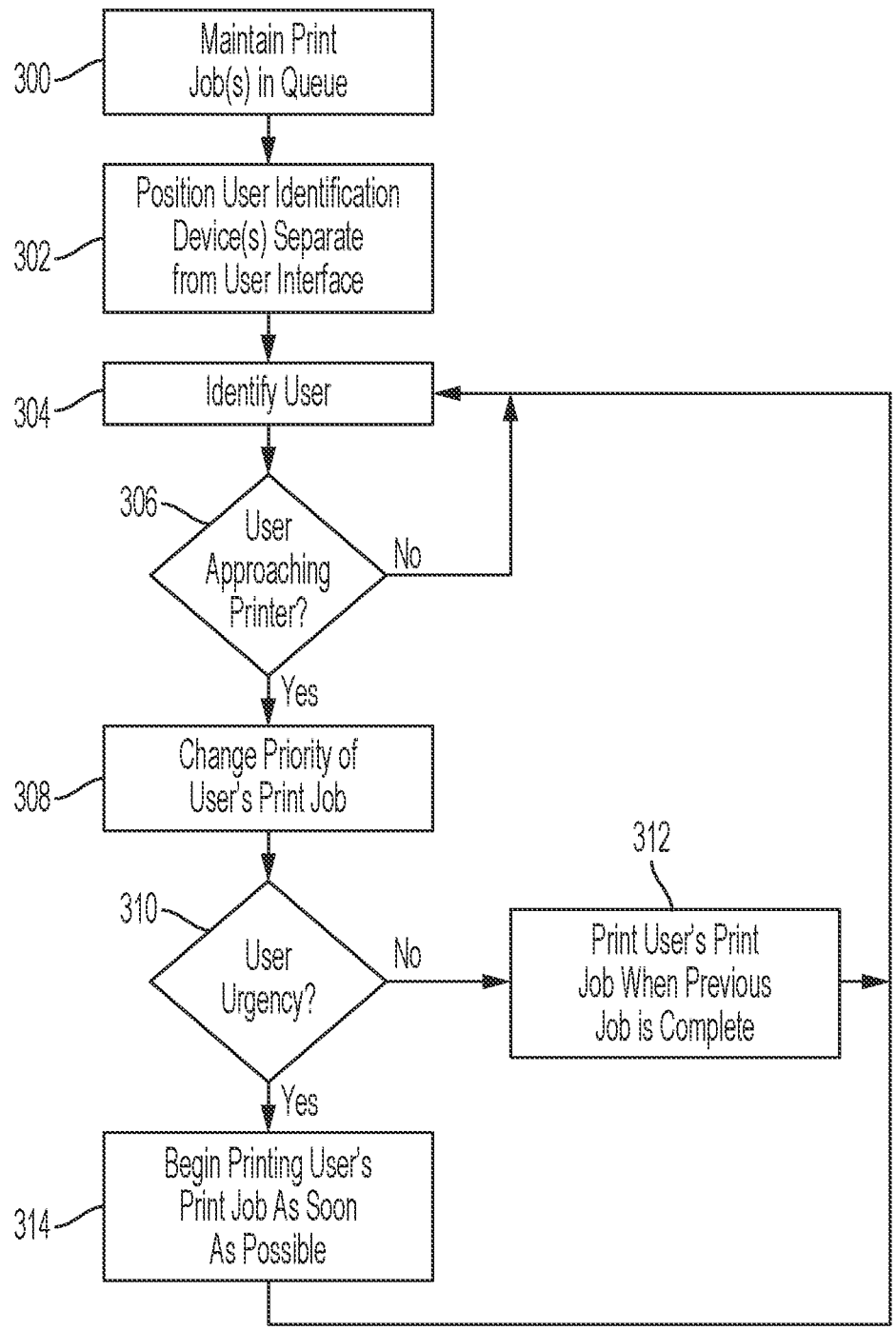
FIG. 3 is a flow diagram of various methods herein.

FIG. 3 is flowchart illustrating exemplary methods herein. In item 300, these methods maintain print job(s) of user(s) in a print queue. The printing device has a user interface positioned to be seen and physically interacted with by the user, and in item 302 the methods herein position the user identification device at a separate location from the user interface that avoids physical interaction between the user and the user identification device. More specifically, in item 302 these methods position the user identification device to be physically separate from the printing device (e.g., to be located along pathways the user travels to approach the printing device) and to be in communication with the printing device through a computerized network.

In item 304, these methods identify the user. These methods use one or more user identification devices operatively connected to the printing device to identify the user in item 304. In item 306, the methods identify whether the user is approaching the printing device. If the user is not approaching the printer in item 306, processing returns to item 304 to identify various users. In item 308, these methods alter the position of the print job within the print queue (e.g., to a higher priority position) when the user identification device identifies the user approaching the printing device (i.e., before the user reaches the printing device).

These methods can also identify urgency of the user using the user identification device to establish whether there is urgency (elevated need) for the print job in item 310. If there is not user urgency in item 310, then these methods print the user's print job in its elevated priority position (e.g., as soon as the current print job finishes) in item 312. However, if there is user urgency in item 310, these methods pause the current printing/processing and print the user's print job immediately in item 314. Through the operation of further increasing the priority of print jobs with a higher need/ urgency in item 310, these methods base the amount that the print queue is altered on the amount that the urgency of the user is elevated. Then, processing again returns to item 304 to identify the user.

Figure 4:
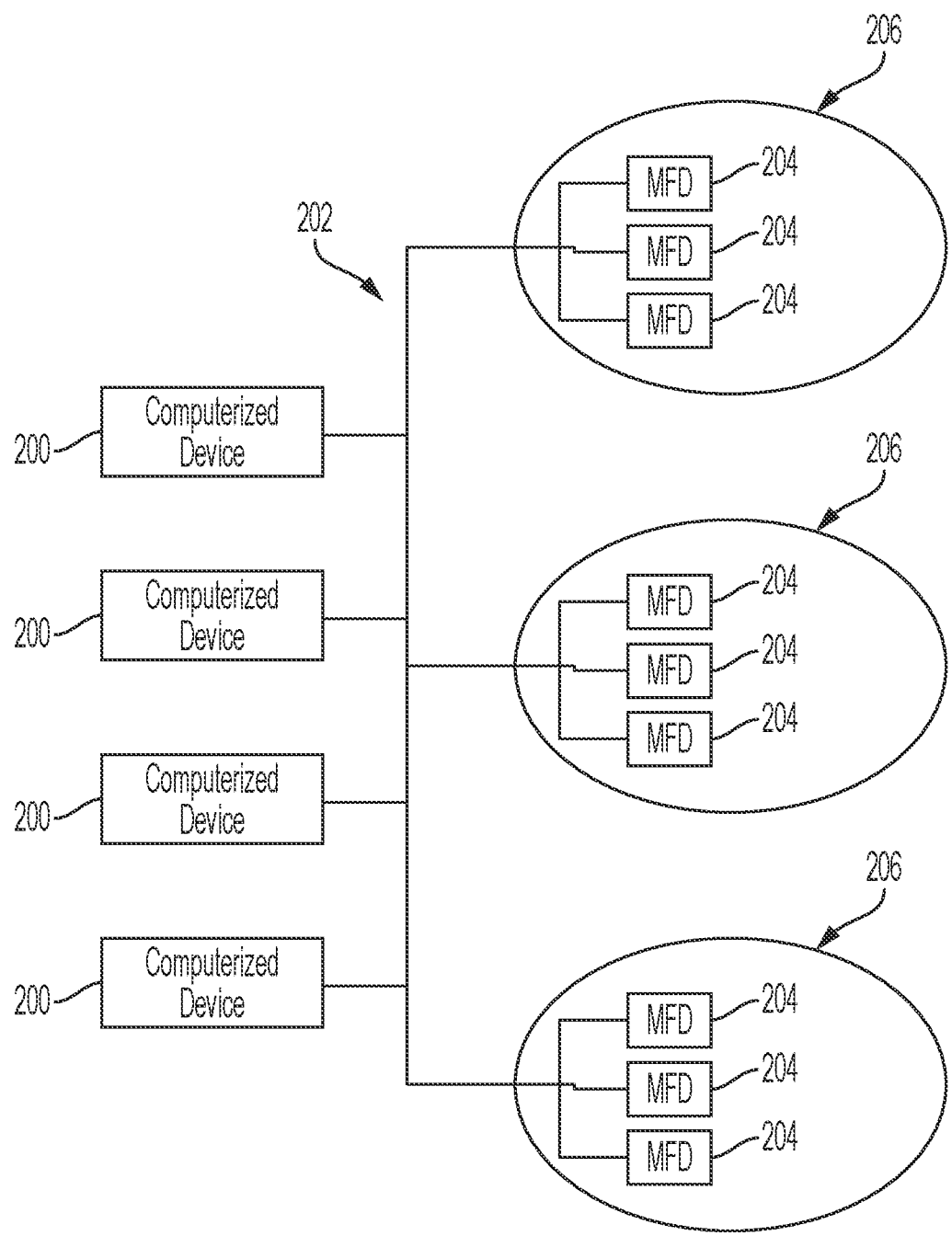
FIG. 4 is a schematic diagram illustrating systems herein.

As shown in FIG. 4, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
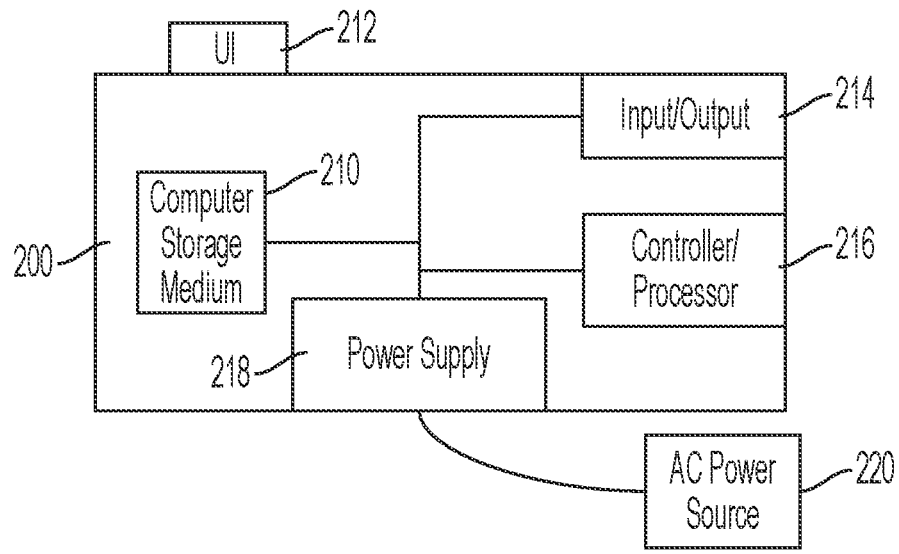
FIG. 5 is a schematic diagram illustrating devices herein.

FIG. 5 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a user interface (UI) assembly 212. The user may receive messages, instructions, and menu options from, and enter instructions through, the user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 5, a body housing has one or more functional components that operate on power supplied from an alternating current (AC) source 220 by the power supply 218. The power supply 218 can comprise a common power conversion unit, power storage element (e.g., a battery, etc.), etc. The print server 200 can perform all processing discussed above, potentially in conjunction with the printer 204 and the user identification devices 130, 132, 134.

Figure 6:
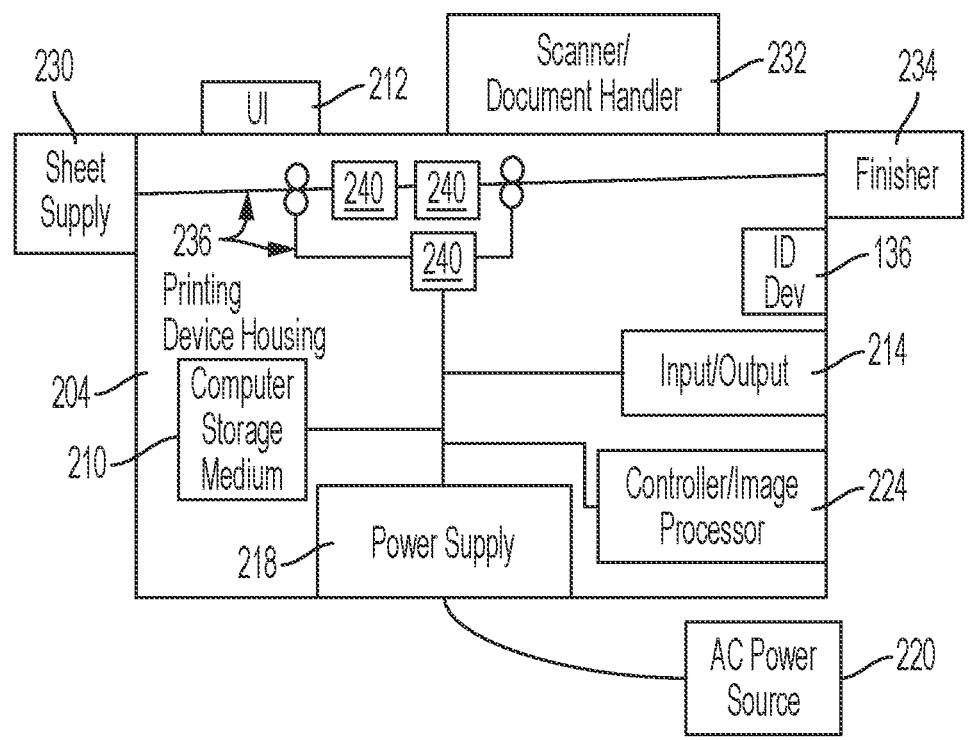
FIG. 6 is a schematic diagram illustrating devices herein.

FIG. 6 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that may be different from a general purpose computer because it can be specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Additionally, FIG. 6 illustrates that one or more of the user identification devices 136 can be attached to, or part of, the printing device 204. However, as also noted above, the user identification device(s) 136 is/are positioned at a separate location from the user interface 212 that avoids physical interaction between the user and the user identification device(s) 136. While any user identification devices 136 that are attached to or part of the printing device 204 can be located at almost any location that avoids physical interaction from the user, the user identification device 136 shown in FIG. 6 is slightly below the user interface 212, reducing the likelihood of user interaction.

If the user identification device 136 includes a camera used for facial or other visual recognition, it can be discretely located to not be noticeable (hidden); if the user identification device 136 includes a microphone or RFID device, such can be concealed behind or in the exterior body surface of the printing device 204. Similarly, other user identification devices 136 can be positioned away from the user interface 212 or concealed behind or in the exterior body surface of the printing device 204 to avoid user contact.

Additionally, any user identification devices 136 that are connected to or are part of the printing device can be tuned and adapted to detect the presence of the user at a great distance from the printing device 204 to allow additional time to perform any pre-print processing or printing prior to the user reaching the printing device 204. For example, a camera, microphone, or wireless reader included as part of such user identification devices 136 may be one capable of high resolution at great distances to identify users approaching the printing device 204 as far away as possible to provide as much additional time as possible.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   a printing device maintaining a print queue; and
   a user identification device operatively connected to the printing device,
   wherein the user identification device is positioned at a location to identify a user when a user is approaching the printing device,
   wherein the user identification device is adapted to identify urgency of the user, and
   wherein the printing device is adapted to alter the print queue based on the user identification device identifying the user approaching the printing device and on the urgency of the user.

2. The system according to claim 1, wherein the printing device has a user interface positioned to be seen and physically interacted with by the user, and wherein the user identification device is positioned at a separate location from the user interface that avoids physical interaction between the user and the user identification device.

3. The system according to claim 1, wherein the printing device is adapted to base an amount the print queue is altered on an amount of the urgency of the user.

4. The system according to claim 1, wherein the user identification device is physically separate from the printing device and in communication with the printing device through a computerized network.

5. The system according to claim 1, wherein the user identification device is separate from the printing device and is located along pathways the user travels to approach the printing device.

6. The system according to claim 1, wherein the printing device is adapted to alter the print queue by moving a print job of the user to a higher priority position within the print queue based on the user identification device identifying the user approaching the printing device.

7. The system according to claim 1, wherein the user identification device comprises at least one of: a facial recognition device; a voice recognition device; a radio frequency identification (RFID) device; and a near field communications (NFC) device.

8. A system comprising:
   a printing device maintaining a print queue; and
   a user identification device operatively connected to the printing device,
   wherein the user identification device is positioned at a location to identify a user when a user is approaching the printing device,
   wherein the user identification device is adapted to identify urgency of the user,
   wherein the print queue maintains a print job of the user, and
   wherein the printing device is adapted to begin printing the print job, based on the user identification device identifying the user approaching the printing device and on the urgency of the user, before the user reaches the printing device.

9. The system according to claim 8, wherein the printing device has a user interface positioned to be seen and physically interacted with by the user, and wherein the user identification device is positioned at a separate location from the user interface that avoids physical interaction between the user and the user identification device.

10. The system according to claim 8, wherein the printing device is adapted to begin printing the print job based on an amount of the urgency of the user.

11. The system according to claim 8, wherein the user identification device is physically separate from the printing device and in communication with the printing device through a computerized network.

12. The system according to claim 8, wherein the user identification device is separate from the printing device and is located along pathways the user travels to approach the printing device.

13. The system according to claim 8, wherein the printing device is adapted to alter the print queue by moving a print job of the user to a higher priority position within the print queue based on the user identification device identifying the user approaching the printing device.

14. The system according to claim 8, wherein the user identification device comprises at least one of: a facial recognition device; a voice recognition device; a radio frequency identification (RFID) device; and a near field communications (NFC) device.

15. A method comprising:
    maintaining a print job of a user in a print queue;

identifying the user approaching a printing device using a user identification device operatively connected to the printing device;

identifying urgency of the user using the user identification device; and altering the print queue based on the user identification device identifying the user approaching the printing device and on the urgency of the user.

16. The method according to claim 15, wherein the printing device has a user interface positioned to be seen and physically interacted with by the user, and wherein the method further comprises positioning the user identification device at a separate location from the user interface that avoids physical interaction between the user and the user identification device.

17. The method according to claim 15, further comprising:

basing an amount of the altering the print queue on an amount of the urgency of the user.

18. The method according to claim 15, further comprising positioning the user identification device physically separate from the printing device and to be in communication with the printing device through a computerized network.

19. The method according to claim 15, further comprising positioning the user identification device separate from the printing device and along pathways the user travels to approach the printing device.

20. The method according to claim 15, wherein the altering the print queue comprises moving a print job of the user to a higher priority position within the print queue based on the user identification device identifying the user approaching the printing device.

* * * * *